(12) United States Patent
Kumar

(10) Patent No.: US 10,060,291 B2
(45) Date of Patent: Aug. 28, 2018

(54) MID-TURBINE FRAME ROD AND TURBINE CASE FLANGE

(71) Applicant: United Technologies Corporation, Hartford, CT (US)

(72) Inventor: Keshava B. Kumar, South Windsor, CT (US)

(73) Assignee: United Technologies Corporation, Farmington, CT (US)

(*) Notice: Subject to any disclaimer, the term of this patent is extended or adjusted under 35 U.S.C. 154(b) by 432 days.

(21) Appl. No.: 14/769,843

(22) PCT Filed: Feb. 18, 2014

(86) PCT No.: PCT/US2014/016754
§ 371 (c)(1),
(2) Date: Aug. 24, 2015

(87) PCT Pub. No.: WO2014/137574
PCT Pub. Date: Sep. 12, 2014

(65) Prior Publication Data
US 2016/0017754 A1    Jan. 21, 2016

Related U.S. Application Data

(60) Provisional application No. 61/772,702, filed on Mar. 5, 2013.

(51) Int. Cl.
*F02C 7/20*     (2006.01)
*F01D 25/24*    (2006.01)
(Continued)

(52) U.S. Cl.
CPC ......... *F01D 25/243* (2013.01); *F01D 25/162* (2013.01); *F02C 3/04* (2013.01);
(Continued)

(58) Field of Classification Search
CPC ...... F01D 25/16; F01D 25/162; F01D 25/243; F01D 25/28; F02C 7/20
See application file for complete search history.

(56) References Cited

U.S. PATENT DOCUMENTS 5,463,812 A    11/1995    Aschenbruck et al.
6,883,303 B1   4/2005     Seda
(Continued)

OTHER PUBLICATIONS

International Preliminary Report on Patentability for International Application No. PCT/US2014/016754 dated Sep. 17, 2015.
(Continued)

*Primary Examiner* — Arun Goyal
(74) *Attorney, Agent, or Firm* — Carlson, Gaskey & Olds, P.C.

(57) ABSTRACT

A turbine section of a gas turbine engine includes a first turbine supported for rotation about an axis, a second turbine spaced axially aft of the for first turbine section for rotation about the axis, and a mid-turbine frame disposed between the first turbine and the second turbine defining a passage between the first turbine and the second turbine. A first case surrounds the first turbine and a second case surrounding the second turbine and attached to the first case. The mid-turbine frame is disposed between the first turbine section and the second turbine section and includes at least one support structure extending through an interface between the first turbine case and the second turbine case.

12 Claims, 4 Drawing Sheets

(51) Int. Cl.
   *F01D 25/16*  (2006.01)
   *F02C 3/04*   (2006.01)
   *F02K 3/06*   (2006.01)

(52) U.S. Cl.
   CPC .............. *F02C 7/20* (2013.01); *F02K 3/06*
        (2013.01); *F05D 2220/323* (2013.01)

(56) References Cited

U.S. PATENT DOCUMENTS

| | | |
|---|---|---|
| 7,594,404 B2 | 9/2009 | Somanath et al. |
| 7,762,087 B2 | 7/2010 | Somanath et al. |
| 8,099,962 B2 | 1/2012 | Durocher et al. |
| 8,181,466 B2 | 5/2012 | Kumar et al. |
| 8,181,467 B2 | 5/2012 | Kumar et al. |
| 8,245,518 B2 * | 8/2012 | Durocher ................ F01D 9/065 415/142 |
| 9,200,536 B2 * | 12/2015 | McCaffrey ............ F01D 25/162 |
| 2007/0261411 A1 | 11/2007 | Nagendra et al. |
| 2008/0022692 A1 | 1/2008 | Nagendra et al. |
| 2008/0031727 A1 | 2/2008 | Sjoqvist |
| 2010/0132376 A1 | 6/2010 | Durocher et al. |
| 2011/0030387 A1 | 2/2011 | Kumar et al. |
| 2011/0079019 A1 | 4/2011 | Durocher et al. |
| 2012/0107087 A1 | 5/2012 | Somanath et al. |
| 2014/0314547 A1 * | 10/2014 | Sander ................ F01D 25/162 415/135 |

OTHER PUBLICATIONS

International Search Report and Written Opinion for International Application No. PCT/US2014/016754 dated May 22, 2014.

* cited by examiner

MID-TURBINE FRAME ROD AND TURBINE CASE FLANGE

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Case structures support sections of the engine and are joined at flanged connections. The turbine section will typically include a high pressure turbine and a low pressure turbine that each are disposed within separate case sections attached to each other. In some engine configurations a mid-turbine frame is disposed between the high pressure turbine and the low pressure turbine and is supported by a separate case structure disposed between cases for the high pressure turbine and low pressure turbine sections. The mid-turbine frame provides support for rotating engine components and includes support structures that extend radially outward to the mid-turbine case structure.

Additional structures add cost, weight and complexity and therefore it is desirable to develop more efficient case structures.

SUMMARY

A gas turbine engine according to an exemplary embodiment of this disclosure, among other possible things includes a fan including a plurality of fan blades rotatable about an axis, a compressor section, a combustor in fluid communication with the compressor section, and a turbine section in fluid communication with the combustor. The turbine section includes a first turbine section disposed within a first case and a second turbine section disposed within a second case. A mid-turbine frame is disposed between the first turbine section and the second turbine section. The mid-turbine frame includes at least one support structure extending through an interface between the first turbine case and the second turbine case.

In a further embodiment of the foregoing gas turbine engine, the mid-turbine frame includes an airfoil for directing flow between the first turbine section and the second turbine section.

In a further embodiment of any of the foregoing gas turbine engines, an outer end of the support structure is attached at the interface between the first case and the second case.

In a further embodiment of any of the foregoing gas turbine engines, includes a boss through which the support structure extends and a fastening member for securing the support structure to the boss.

In a further embodiment of any of the foregoing gas turbine engines, includes a first flange of the first case attached to a second flange of the second case, with both the first flange and the second flange extending transverse to the axis.

In a further embodiment of any of the foregoing gas turbine engines, the at least one support structure supports rotation of at least one rotatable shaft extending through the turbine section.

In a further embodiment of any of the foregoing gas turbine engines, the first case and the second case each include continuous uninterrupted structures.

A turbine section of a gas turbine engine according to an exemplary embodiment of this disclosure, among other possible things includes a first turbine supported for rotation about an axis, a second turbine spaced axially aft of the for first turbine section for rotation about the axis, a mid-turbine frame disposed between the first turbine and the second turbine defining a passage between the first turbine and the second turbine, a first case surrounding the first turbine, and a second case surrounding the second turbine and attached to the first case, wherein the mid-turbine frame extends through an interface between the first case and the second case.

In a further embodiment of the foregoing turbine section, the mid-turbine frame includes an airfoil for directing flow between the first turbine section and the second turbine section.

In a further embodiment of any of the foregoing turbine sections, the mid-turbine frame includes a support structure and an outer end of the support structure is attached at the interface between the first case and the second case.

In a further embodiment of any of the foregoing turbine sections, includes a boss through which the support structure extends and a fastening member for securing the support structure to the boss.

In a further embodiment of any of the foregoing turbine sections, the support structure supports rotation of at least one rotatable shaft extending through the turbine section.

In a further embodiment of any of the foregoing turbine sections, includes a first flange of the first case attached to a second flange of the second case, with both the first flange and the second flange extending transverse to the axis.

In a further embodiment of any of the foregoing turbine sections, the first case and the second case each include continuous uninterrupted structures.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
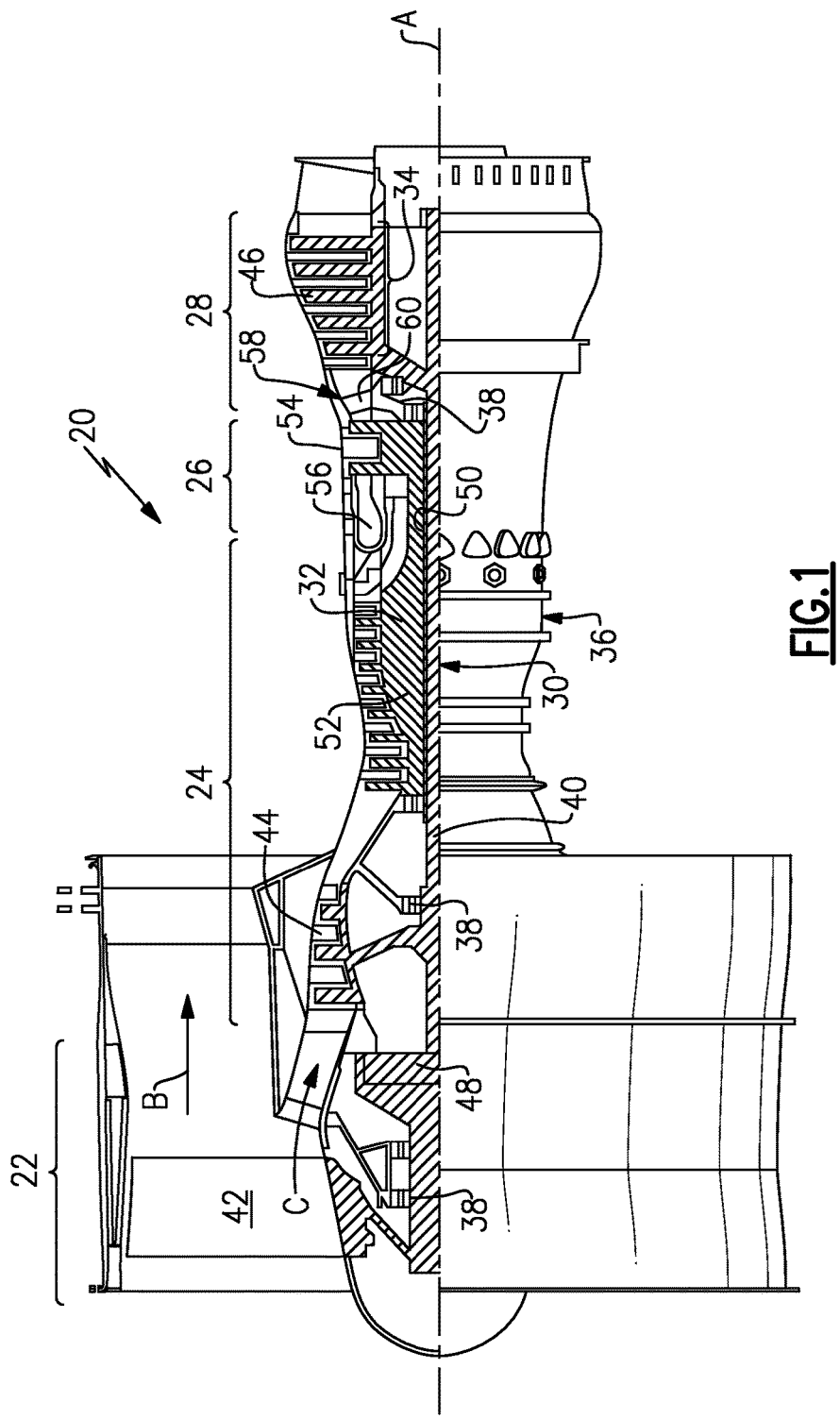
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46. The mid-turbine frame 58 is also sometimes referred to as sometimes as a turbine intermediate case.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7)^{0.5}]$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
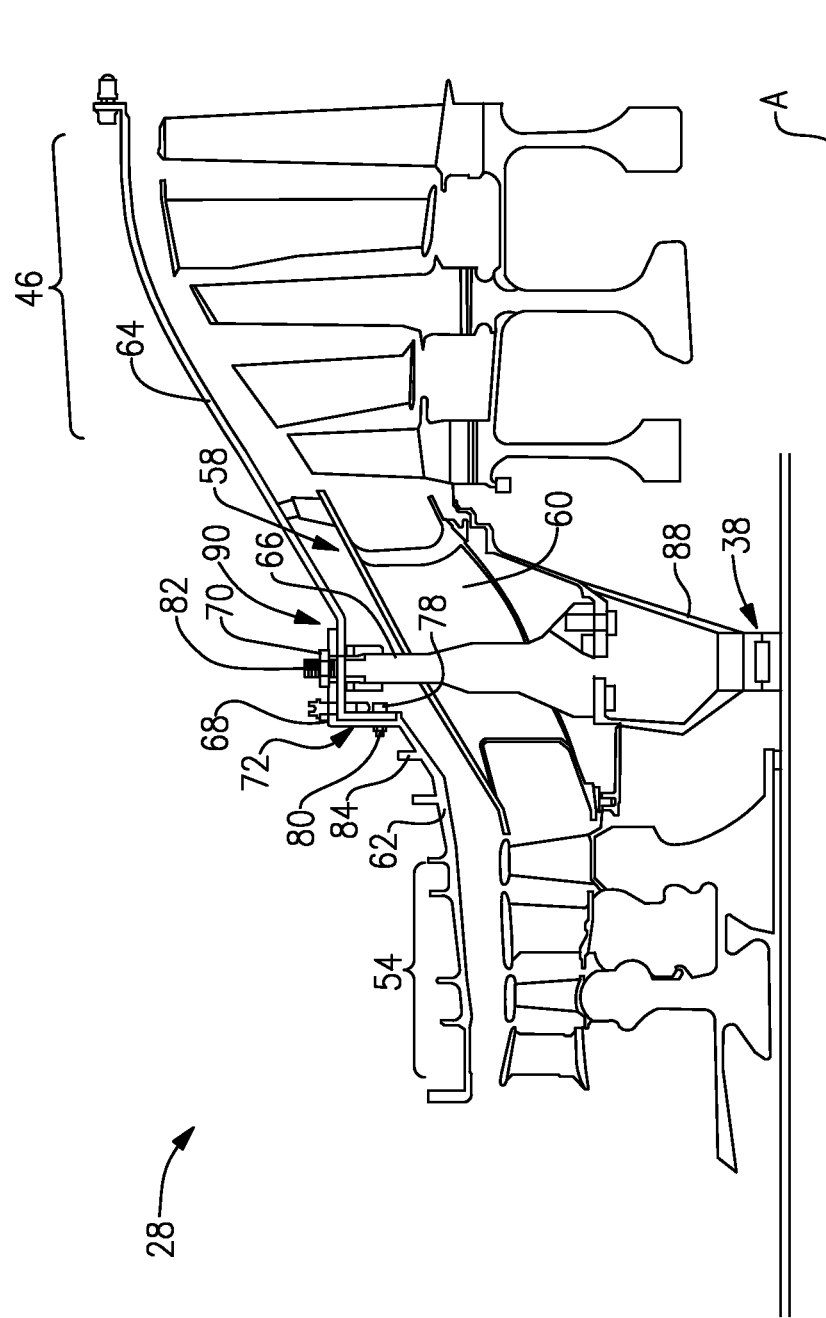
FIG. 2 is a cross-sectional view of a turbine section of a gas turbine engine.

Referring to FIG. 2 with continued reference to FIG. 1, the example turbine section 28 includes the high pressure turbine 54 disposed within a high pressure turbine case 62 and a low pressure turbine 46 disposed within the low pressure turbine case 64. Between the high pressure turbine 54 and the low pressure turbine 46 is the mid-turbine frame 58. The example mid-turbine frame 58 includes a vane 60 that directs flow from the high pressure turbine 54 into the low pressure turbine 46.

The mid-turbine frame 58 includes an I-rod 66 that extends radially inward from the case 64 to support the bearing assembly 38. A support structure 88 extends between the I-rod 66 and the bearing assembly 38. An I-rod boss 68 is supported on the case 64. The I-rod 66 extends through the I-rod boss 68 and the low pressure turbine case 64 and is secured at an outer end 82 by a fastener that in this example is a threaded nut 70.

The example mid-turbine frame 58 extends across an interface 72 between the low pressure turbine case 64 and the high pressure turbine case 62 such that additional case structures between high and low pressure turbine cases 62, 64 are not required. The high pressure turbine case 64 includes a first flange 74 that is attached to a second flange 76 of the low pressure turbine case 64. A fastening member 78 is utilized to attach the high pressure turbine case 64 to the low pressure turbine case 64.

Figure 3:
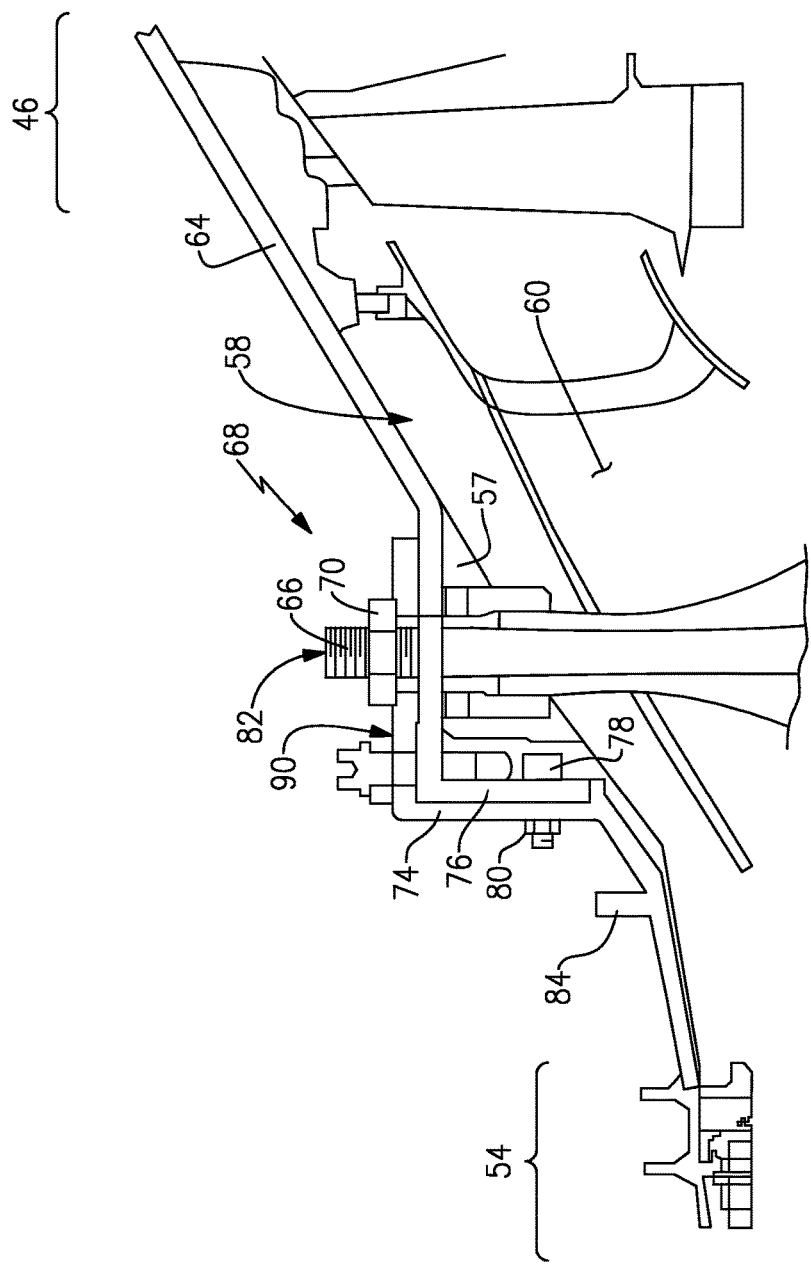
FIG. 3 is a cross-section of an interface between a high pressure turbine case and a low pressure turbine case.

Referring to FIG. 3 with continued reference to FIG. 2, the example low pressure turbine case 64 is axially rearward and radially outward of the high pressure turbine case 62. As appreciated other relative orientations between the low pressure turbine case 64 and the high pressure turbine case 62 are within the contemplation of this disclosure. The interface between the high pressure turbine case 54 and the low pressure turbine case 64 includes the I-rod boss 68. The I-rod 66 extends through the low pressure turbine case 64 and is fastened at an outer surface 90 of the case 64 by the threaded nut 70. The nut 70 is torqued to hold the I-rod 66 in place. The example I-rod 66 comprises a support structure that supports a plurality of bearing structures 38 that support rotation of the inner and outer shafts 440, 50. A gusset 57 can be utilized to provide additional stiffness and load transfer.

The high pressure turbine case 62 includes a first stiffener 84 disposed axially forward of the interface 72. The stiffening structure 84 maintains a desired stiffness and roundness of the cases 62, 64 during operation and torqueing of the nut 70.

Figure 4:
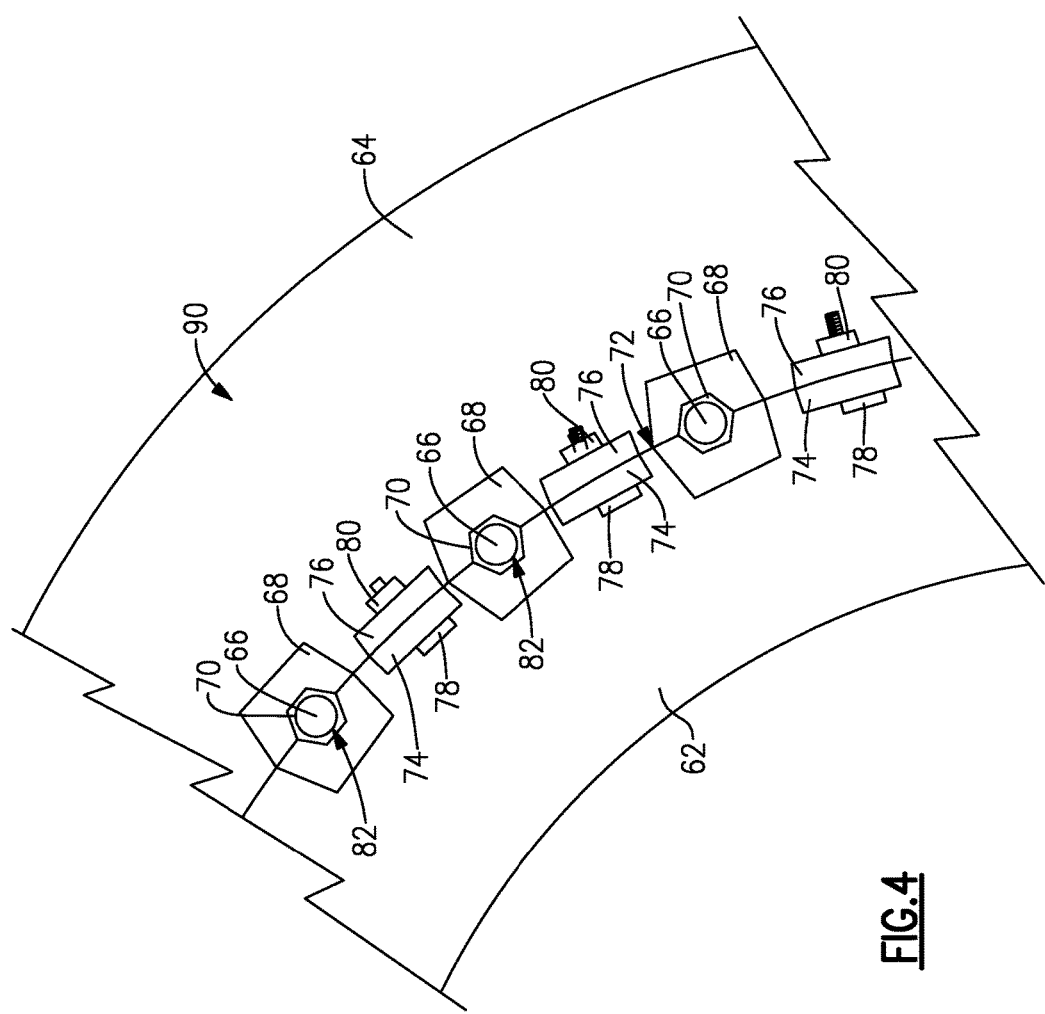
FIG. 4 is a schematic view of an interface between the high pressure turbine case and the low pressure turbine case.

Referring to FIG. 4 with continued reference to FIG. 2, an outer surface of the interface 72 between the low pressure turbine case 64 and the high pressure turbine case 62 is shown. In this example, a plurality of I-rods 66 are shown extending from the interface of the turbine cases 62 and 64. The I-rod bosses 68 are integral portions of each of the turbine cases 62 and 64 and mate at the interface 72. The I-rod bosses 68 are not required to be of an increased cross-sectional thickness because the interface 72 between the turbine cases 62 and 64 provides the desired rigidity and structural stiffness for the I-rod 66. The interface 72 also includes the first flange 74 and the second flange 76 that are attached by way of the attachment members 78 and 80. In this example, the attachment members 78 and 80 comprise a nut and bolt configuration that extends through openings in corresponding first and second flanges 74, 76.

Mounting of the mid-turbine frame 58 within one of the example high pressure turbine case 62 and low pressure turbine case 64 eliminates a case structure and the fastening members and flange configurations required to for attaching to the other case structures. Moreover, the example interface 72 between the low pressure turbine case 64 and the high pressure turbine case 62 integrates the I-rod boss 68 with the first and second flanges 74, 76 to provide a single connection interface between the low pressure turbine case 64, the high pressure turbine case 62, and the I-rod 66. The integration of all of these features into a single attachment structure reduces cost, assembly, time and weight. Moreover, the combined flanges of the example interface 72 provide improved stiffness control and improved resistance to out of round conditions.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
   a fan including a plurality of fan blades rotatable about an axis;
   a compressor section;
   a combustor in fluid communication with the compressor section;
   a turbine section in fluid communication with the combustor, wherein the turbine section includes a first turbine section disposed within a first case with, a first flange and a second turbine section disposed within a second case with a second flange, wherein the first flange is attached to the second flange; and
   a mid-turbine frame disposed between the first turbine section and the second turbine section, the mid-turbine frame including an airfoil and at least one support structure, the at least one support structure extending through an interface between the first turbine case and the second turbine case, wherein both the first flange and the second flange extend transverse to the axis.

2. The gas turbine engine as recited in claim 1, wherein the airfoil directs flow between the first turbine section and the second turbine section.

3. The gas turbine engine as recited in claim 1, wherein an outer end of the support structure is attached at the interface between the first case and the second case.

4. The gas turbine engine as recited in claim 1, including a boss through which the support structure extends and a fastening member for securing the support structure to the boss.

5. The gas turbine engine as recited in claim 4, wherein the at least one support structure supports rotation of at least one rotatable shaft extending through the turbine section.

6. The gas turbine engine as recited in claim 1, wherein the first case and the second case each comprise continuous uninterrupted structures.

7. A turbine section of a gas turbine engine comprising:
   a first turbine supported for rotation about an axis;
   a second turbine spaced axially aft of the first turbine section for rotation about the axis;
   a mid-turbine frame disposed between the first turbine and the second turbine defining a passage between the first turbine and the second turbine, the mid-turbine frame including an airfoil and a support structure;
   a first case including a first flange, the first case surrounding the first turbine; and
   a second case including a second flange, the second case surrounding the second turbine and the second flange is attached to the first flange of the first case, wherein the support structure of the mid-turbine frame extends through an interface between the first case and the second case, wherein both the first flange and the second flange extend transverse to the axis.

8. The turbine section as recited in claim 7, wherein the airfoil directs flow between the first turbine section and the second turbine section.

9. The turbine section as recited in claim 8, wherein the support structure includes an outer end that is attached at the interface between the first case and the second case.

10. The turbine section as recited in claim 9, including a boss through which the outer end of the support structure extends and a fastening member for securing the outer end of the support structure to the boss.

11. The turbine section as recited in claim 9, wherein the support structure supports rotation of at least one rotatable shaft extending through the turbine section.

12. The turbine section as recited in claim 7, wherein the first case and the second case each comprise continuous uninterrupted structures.

* * * * *